(12) United States Patent
Steele et al.

(10) Patent No.: US 8,303,678 B2
(45) Date of Patent: Nov. 6, 2012

(54) INTAKE AIR FILTER SYSTEM

(75) Inventors: Richard P. Steele, Southampton (GB);
Stephen Cromwell, Horndean (GB)

(73) Assignee: General Electric Company,
Schenectady, NY (US)

( * ) Notice: Subject to any disclaimer, the term of this patent is extended or adjusted under 35 U.S.C. 154(b) by 385 days.

(21) Appl. No.: 12/649,390

(22) Filed: Dec. 30, 2009

(65) Prior Publication Data

US 2011/0154991 A1    Jun. 30, 2011

(51) Int. Cl.
*B01D 46/00* (2006.01)
(52) U.S. Cl. .............. 55/490; 55/430; 55/483; 55/495; 55/497; 55/521; 55/529; 55/DIG. 31
(58) Field of Classification Search ............ 55/483, 55/484, 497, 502, 521, DIG. 31, 428, 430, 55/490, 495, 529
See application file for complete search history.

(56) References Cited

U.S. PATENT DOCUMENTS

| | | | | |
|---|---|---|---|---|
| 4,225,328 | A | * | 9/1980 | Stiehl .............................. 55/378 |
| 6,602,328 | B2 | * | 8/2003 | Doi et al. ........................ 95/278 |
| 6,955,696 | B1 | * | 10/2005 | Ost et al. ......................... 55/357 |
| 7,048,501 | B2 | * | 5/2006 | Katayama et al. ......... 415/121.2 |
| 8,048,186 | B2 | * | 11/2011 | Mann et al. ..................... 55/483 |
| 8,105,409 | B2 | * | 1/2012 | Mann et al. ..................... 55/483 |
| 2011/0067368 | A1 | * | 3/2011 | Handley et al. ................ 55/486 |

FOREIGN PATENT DOCUMENTS

| | | |
|---|---|---|
| EP | 1447121 A1 | 8/2004 |
| EP | 1674144 A1 | 6/2006 |
| JP | 2006090281 A * | 4/2006 |
| JP | 2006090281 A2 | 4/2006 |

* cited by examiner

*Primary Examiner* — Robert Clemente
(74) *Attorney, Agent, or Firm* — Hiscock & Barclay LLP

(57) ABSTRACT

An air intake filter system for a gas turbine. The air intake filter system comprises a housing connectable with a gas turbine for fluid communication with the gas turbine. A frame is located within the housing. A filter assembly comprises a flange connectible with the frame to mount the filter assembly. The flange has a portion contained in a first plane that is adapted to extend in a substantially vertical direction when mounted in the frame. A filter portion is attached to the flange for filtering air therethrough that is communicated to the gas turbine. The filter portion includes filter media capable of separating moisture from air flowing through the filter portion. A moisture resistant first end is attached to the flange and filter portion. The first end has a portion contained in a second plane that extends at an acute angle relative to the first plane. The first end is adapted to form a drain surface to direct moisture away from the interior of the filter assembly.

15 Claims, 3 Drawing Sheets

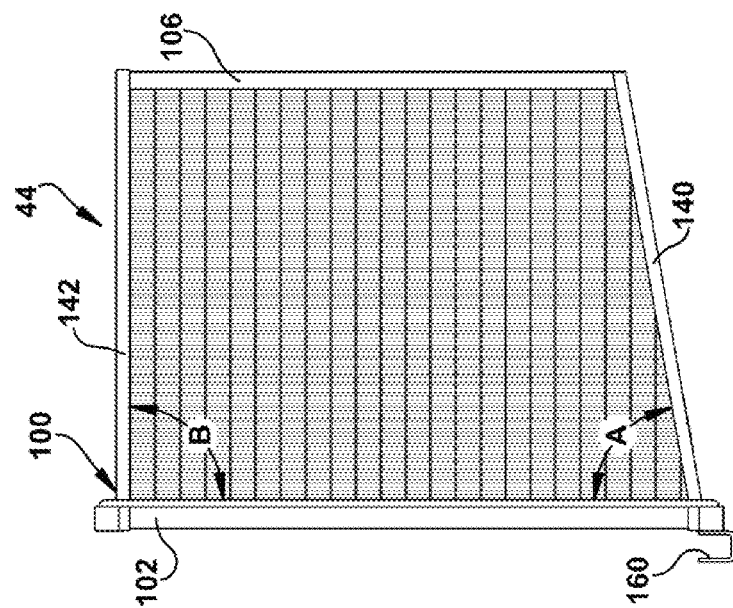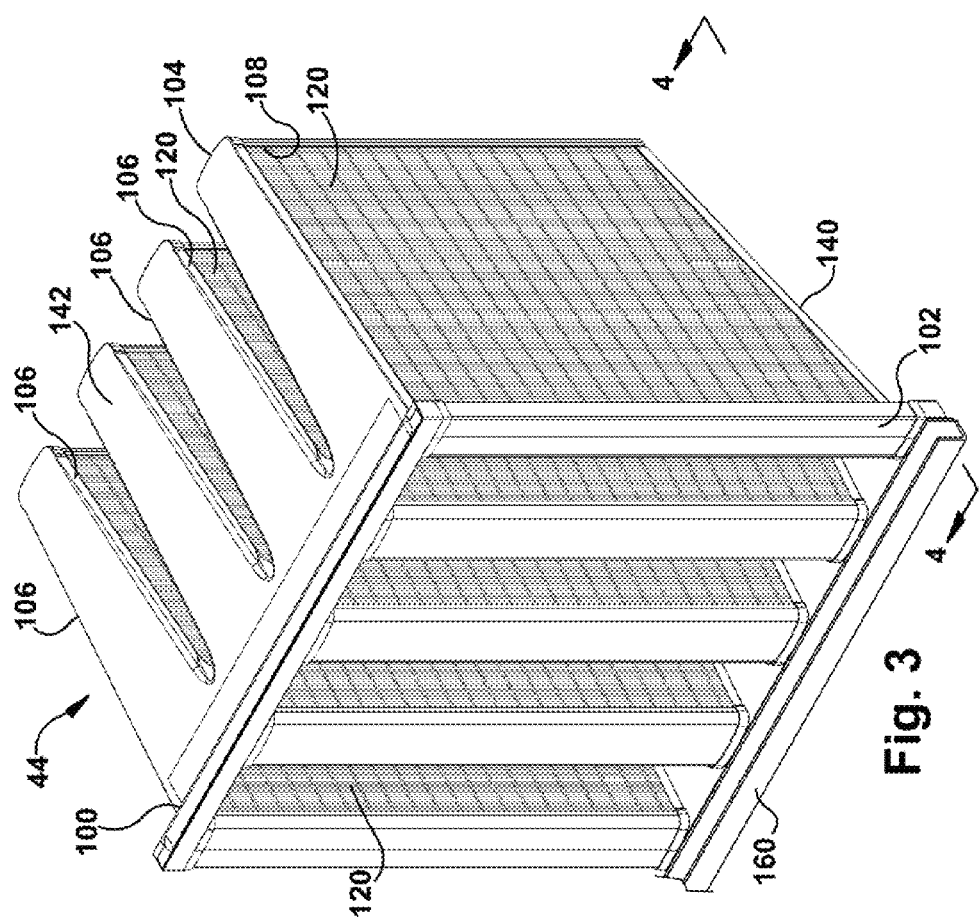

INTAKE AIR FILTER SYSTEM

BACKGROUND OF THE INVENTION

The present invention is generally directed to a gas filtration system. In particular, the present invention is directed to an improved intake air filter and system for use with a gas turbine.

Power generation equipment, such as gas turbines, uses a large quantity of intake air for combustion. To maintain suitable performance of the gas turbine, the intake air is filtered to remove unwanted dust, moisture, and other contaminants that can damage components of the gas turbine. The filters that filter the intake air are typically arranged in an array on a frame located within a housing.

The filters may be a known V-cell mini-pleat type of static filter. That is, each filter has a series of paired filtration portions arranged in a V-shape and connected together at an apex. The bases of the V-shape filtration portions are attached to a flange. Solid ends are connected to the filtration portions and flange. The ends extend substantially orthogonal relative to the filtration portions and the flange. The flange is typically mounted in a frame to extend substantially vertical and the ends extend substantially horizontal. Thus, as moisture is removed from the air flowing through the filtration portions, the moisture tends to accumulate on the lower end and can become re-entrained in the air flowing through the filtration portions. This can wet the filtration media and adversely affect filtration performance by carrying moisture through the filter media to the gas turbine.

Prior attempts to drain the moisture from the interior of the filter include mounting the filters in a frame that is tilted. This can increase the cost of the frame and housing and the "footprint" or floor space occupied by the housing. It is, therefore, advantageous to provide a filter assembly and system that is small, inexpensive and prevents re-entrainment of separated moisture into the air flowing through the filtration portions.

BRIEF DESCRIPTION OF THE INVENTION

The invention, according to at least one aspect, offers an improved filter and system for minimizing the moisture removed by a filter from re-entering the flow of air through the filter. One aspect of the invention is an air intake filter system for a gas turbine. The air intake filter system comprises a housing connectable with a gas turbine for fluid communication with the gas turbine. A frame is located within the housing. A filter assembly comprises a flange connectible with the frame to mount the filter assembly. The flange has a portion contained in a first plane that is adapted to extend in a substantially vertical direction when mounted in the frame. A filter portion is attached to the flange for filtering air therethrough that is communicated to the gas turbine. The filter portion includes filter media capable of separating moisture from air flowing through the filter portion. A moisture resistant first end is attached to the flange and filter portion. The first end has a portion contained in a second plane that extends at an acute angle relative to the first plane. The first end is adapted to form a drain surface to direct moisture away from the interior of the filter assembly.

Another aspect of the invention is a filter assembly that comprises a flange connectible with the frame to mount the filter assembly. The flange has a portion contained in a first plane. A filter portion is attached to the flange. The filter portion includes filter media capable of separating moisture from gas flowing through the filter portion. A moisture resistant first end is attached to the flange and filter portion. The first end has a portion contained in a second plane that extends at an acute angle relative to the first plane. The first end is adapted to form a drain surface to direct moisture separated by the filter media away from the interior of the filter assembly.

Yet another aspect of the invention is a filter assembly. The filter assembly comprises a flange connectible with the frame to mount the filter assembly. A filter portion is attached to the flange. The filter portion includes filter media capable of separating moisture from gas flowing through the filter portion. A moisture resistant first end is attached to the flange and filter portion. The end is shaped and oriented to drain and direct moisture separated by the filter media away from the interior of the filter assembly.

BRIEF DESCRIPTION OF THE DRAWINGS

Further features of the invention will become apparent to those skilled in the art to which the invention relates from reading the following description with reference to the accompanying drawings, in which:

FIG. 3 is a perspective view of a filter, according to one aspect of the invention, for use in the system illustrated in FIGS. 1-2; and FIG. 4 is an enlarged elevation view of the filter illustrated in FIG. 3, taken approximately along line 4-4 in FIG. 3.

DETAILED DESCRIPTION OF THE INVENTION

Figure 1:
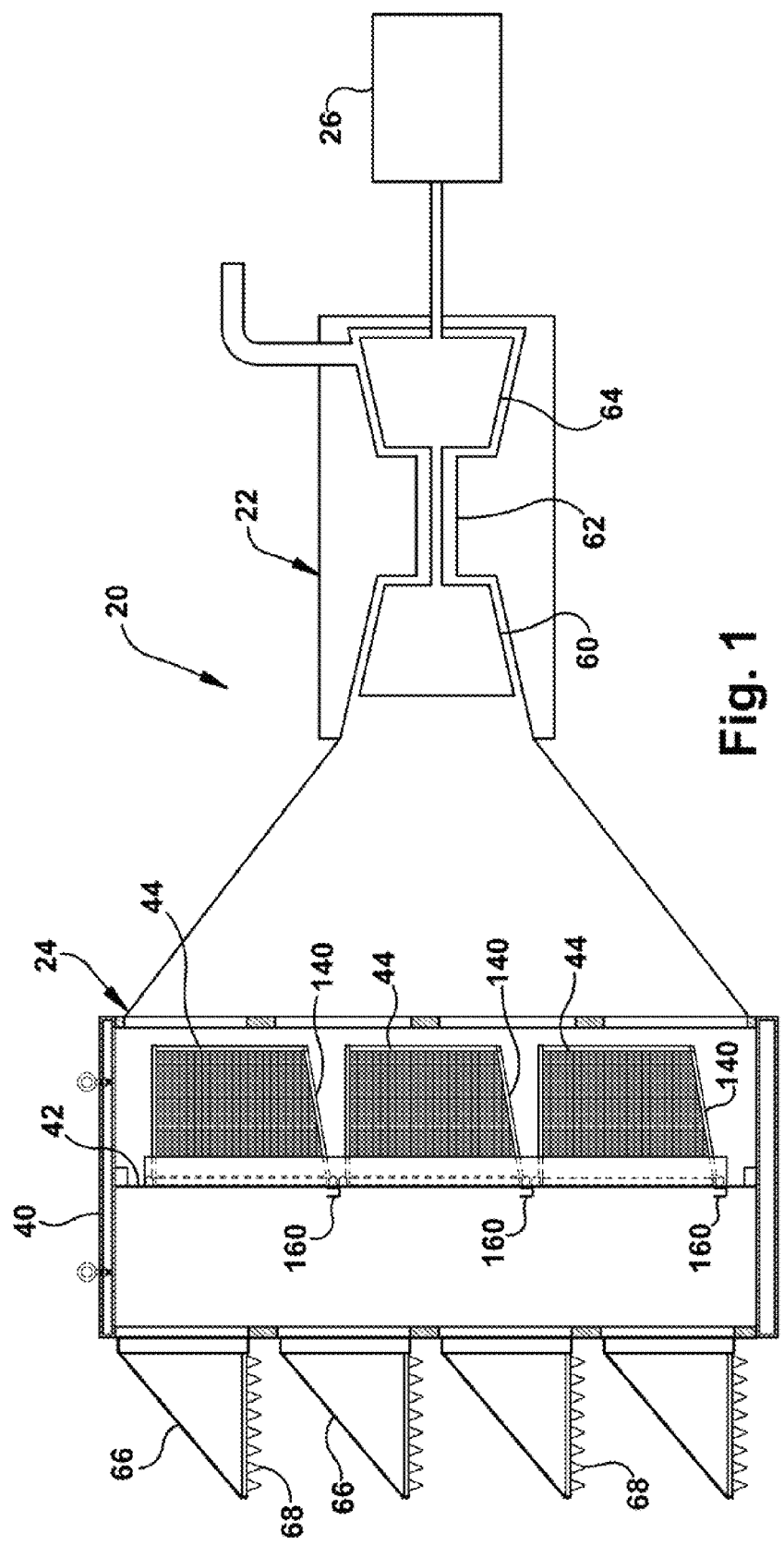
FIG. 1 is a is a schematic view of a filter and air intake filter system, constructed according to one aspect of the invention for use with a gas turbine.

A power generation unit 20 is illustrated in FIG. 1. The power generation unit 20 includes a gas turbine 22 and an intake air filter system 24, according to one aspect of the invention. Air from the surrounding environment is drawn into intake air filter system 24 for filtration and delivery to the gas turbine 22. The power generation unit 20 may be used in any of numerous applications, such as without limitation generating electrical power by means of a generator 26 or providing motive power, directly or indirectly.

The intake air filter system 24 includes a housing 40. The housing 40 is made from any suitable material, such as sheet metal. The housing 40 supports a frame 42. The frame 42 is made from any suitable material, such as metal tubes, channels, beams or extrusions that are fixed to one another by suitable attachment means such as welding. The frame 42 supports a plurality of filter assemblies or filters 44. The filters 44 remove contaminants such as dust, dirt, moisture, salt, carbon and other contaminants from the air flowing therethrough that may tend to reduce the performance or service life of the gas turbine 22. The housing 40 may be several stories high, and may contain up to several hundred filters 44, which may be held by several frames 42.

The gas turbine 22 includes an air compressor section 60 that draws intake air into the gas turbine 22 for combustion in a combustor section 62 and work in a turbine section 64. The air is drawn first from the surrounding environment through hoods 66 of the housing 40. As the intake air enters the housing 40 through the hoods 66, it may first pass through a prefilter or a de-mister 68. The air then flows through the array of filters 44 for final filtration before it is directed to the compressor section 60.

Figure 2:
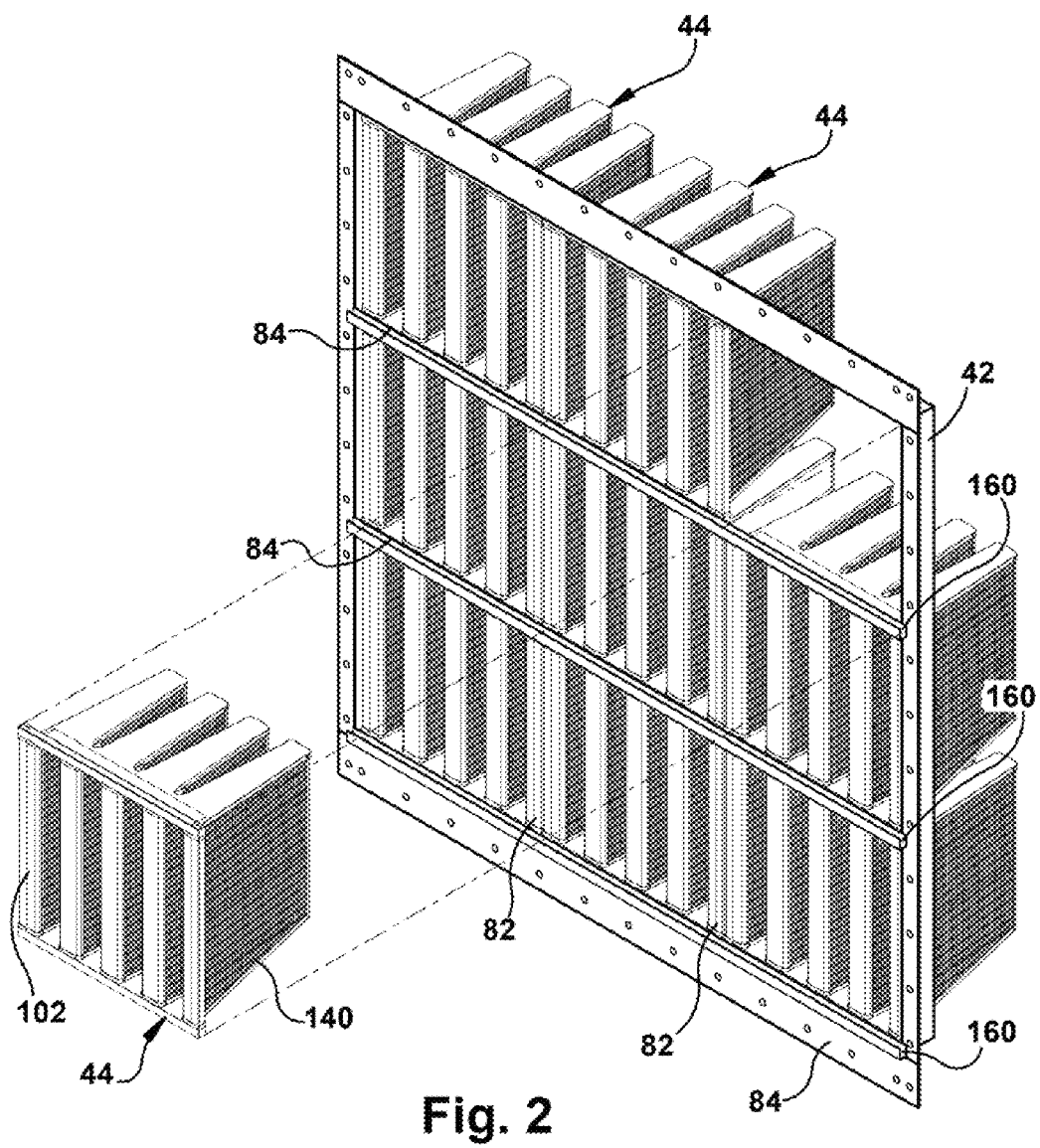
FIG. 2 is an enlarged perspective view of a portion of the air intake filter system illustrated in FIG. 1.

As illustrated in FIG. 2, the frame 42 includes a set of vertical supports 82 and horizontal supports 84 that support an array of the filters 44. The filters 44 may be held in place by any suitable means, such as clamps or latches (not shown). The filters 44 may be any suitable type, such as static V-cell mini-pleat filter cartridges, for example. In some embodiments, the filters 44 may be constructed as high-efficiency AltairSupernova™ filters, available from General Electric. Additionally, the filters 44 may also be of any suitable size, construction, configuration or material.

Each filter assembly 44 (FIG. 3) includes a filter body 100. The filter body 100 is preferably made of injection molded plastic. The filter body 100 has a flange 102 that is connectible with the frame 42 to mount the filter assembly within the frame. A gasket (not shown) may be disposed around the periphery of the flange 102 and located between the filter 44 and the frame 42 to provide an airtight seal between the filter and the frame. The flange 102 has a portion contained in a first plane that is adapted to extend in a substantially vertical direction when mounted in the frame 42. While the flange 102 is illustrated for exemplary purposes as being oriented vertically, it will be apparent that the flange may be in any suitable orientation. It will also be apparent that the flange 102 may be oriented vertically in a stationary land based or off-shore power generation unit 20, but in a mobile marine application the flange may have non-vertical orientations during use.

The filter body 100 has a filter portion 104 that is attached to the flange 102 for filtering air therethrough that is communicated to the gas turbine 22. The filter portion 104 has a series of pairs of side panels 106 fixed to and extending from the flange 102 of the filter body 100. The panels 106 are preferably formed as one piece with the flange 102 during a plastic injection molding process. Each panel 106 has an opening 108 therein.

Filter media 120 is supported by the filter portion 106 in each opening 108 of the filter body 100. The filter media 120 is capable of separating moisture from air flowing through the filter portion as well as particulates. The filter media 120 is made from any suitable material. Preferably, the filter media 120 has hydrophobic characteristics to suitably separate moisture from the air that passes through the filter media.

The filter body 100 also has a moisture resistant first, or lower as viewed in FIGS. 3-4, end 140 attached to the flange 102 and filter portion 104. The lower end 140 is preferably formed as one piece from plastic with the flange 102 during an injection molding process. The lower end 140 is substantially planar and has a portion contained in a second plane that extends at an acute angle A (FIG. 4) relative to the first plane of the flange 102. The acute angle A is in the range of about 1° to 30° and preferably in the range of about 10° to 15°. The lower end 140 is adapted to form a drain surface to direct moisture away from the interior of the filter 44 due to this angular orientation and prevent the separated water from being re-entrained in the stream of air that flows through the filter 44.

The filter body 100 further has a moisture resistant second, or upper as viewed in FIGS. 3-4, end 142 attached to the flange 102 and filter portion 104. The upper end 142 has a portion contained in a third plane that extends substantially at an angle B that is orthogonal relative to the first plane of the flange 102. It will be apparent that the upper end 142 could also extend at an acute angle relative to the first plane of the flange 102.

A plurality of channels 160 are mounted to the horizontal support 84 of the frame 42 and located adjacent the lower end 140 of the filter 44. The channel 160 made be made from a U-shaped metal extrusion and mounted to the frame 42 so the open side faces upward. The channel 160 receives moisture from the interior of the filter 44 that is separated by the filter media 120 that drains downhill due to the inclined orientation of the lower end 140 of the filter. The channel 160 directs water and moisture away from the filter 44. The channels 160 may be oriented at a slight angle relative to horizontal to facilitate removal of water from the location of the filters 44. It will be apparent that the housing 40 could support the channel 160 in a suitable manner to direct water away from the filter 44.

From the above description of at least one aspect of the invention, those skilled in the art will perceive improvements, changes and modifications. Such improvements, changes and modifications within the skill of the art are intended to be covered by the appended claims.

What is claimed is:

1. An air intake filter system for a gas turbine, the air intake filter system comprising:
   a housing connectable with a gas turbine for fluid communication with the gas turbine;
   a frame located within the housing; and
   a filter assembly comprising:
   a flange connectible with the frame to mount the filter assembly, the flange having a portion contained in a first plane that is adapted to extend in a substantially vertical direction when mounted in the frame;
   a filter portion attached to the flange for filtering air therethrough that is communicated to the gas turbine, the filter portion including filter media capable of separating moisture from air flowing through the filter portion; and
   a moisture resistant first end attached to the flange and filter portion, the first end having a portion contained in a second plane that extends at an acute angle relative to the first plane, the first end adapted to form a drain surface to direct moisture away from the interior of the filter assembly.

2. The air intake filter system of claim 1 wherein at least one of the frame and housing have a channel for receiving moisture from the drain surface of the end of the filter assembly and direct the moisture away from the filter assembly.

3. The air intake filter system of claim 1 wherein the acute angle is the range of about 1° to 30°.

4. The air intake filter system of claim 1 further including a second end that is moisture resistant and adapted to be located opposite the first end.

5. The air intake filter system of claim 4 wherein the second end has a portion contained in a third plane, the second and third planes extending at an acute angle relative to the first plane.

6. The air intake filter system of claim 1 wherein the filter assembly is in the form of a V-cell mini-pleat filter.

7. A filter assembly comprising:
   a flange connectible with a frame to mount the filter assembly, the flange having a portion contained in a first plane;
   a filter portion attached to the flange, the filter portion including filter media capable of separating moisture from gas flowing through the filter portion; and
   a moisture resistant first end attached to the flange and filter portion, the first end having a portion contained in a second plane that extends at an acute angle relative to the first plane, the first end adapted to form a drain surface to direct moisture separated by the filter media away from the interior of the filter assembly.

8. The air intake filter system of claim 7 wherein the acute angle is the range of about 1° to 30°.

9. The air intake filter system of claim 7 further including a second end that is moisture resistant and adapted to be located opposite the first end.

10. The air intake filter system of claim 9 wherein the second end has a portion contained in a third plane, the second and third planes extending at an acute angle relative to the first plane.

11. The air intake filter system of claim 7 wherein the filter assembly is in the form of a V-cell mini-pleat filter.

12. A filter assembly comprising:
   a flange connectible with a frame to mount the filter assembly;
   a filter portion attached to the flange, the filter portion including filter media capable of separating moisture from gas flowing through the filter portion; and
   a moisture resistant first end attached to the flange and filter portion, the end being shaped and oriented at a non-orthogonal angle to the flange to drain and direct moisture separated by the filter media away from the interior of the filter assembly.

13. The air intake filter system of claim 12 further including a second end that is moisture resistant and adapted to be located opposite the first end.

14. The air intake filter system of claim 13 wherein, the flange has a portion contained in a first plane, the first end has a portion contained in a second plane, and the second end has a portion contained in a third plane, the second and third planes extending at an acute angle relative to the first plane.

15. The air intake filter system of claim 12 wherein the filter assembly is in the form of a V-cell mini-pleat filter.

* * * * *